United States Patent [19]
Clark

[11] Patent Number: 5,974,729
[45] Date of Patent: Nov. 2, 1999

[54] FRUIT OR VEGETABLE GUARD

[76] Inventor: Suzanne Clark, 3020 Club Dr., Los Angeles, Calif. 90064

[21] Appl. No.: 09/070,949

[22] Filed: May 1, 1998

[51] Int. Cl.[6] .................................................. A01G 13/00
[52] U.S. Cl. .................................................................. 47/26
[58] Field of Search ........................... 47/26, 28.1, 261 F, 47/21; 220/676, DIG. 27

[56] References Cited

U.S. PATENT DOCUMENTS

| | | | |
|---|---|---|---|
| 198,159 | 12/1877 | Schermerhorn | 47/28.1 |
| 2,096,507 | 10/1937 | Czeszcziczki, Jr. | 446/386 |
| 2,865,138 | 12/1958 | Eidman et al. | 47/26 |
| 4,187,639 | 2/1980 | Ono | 47/58.1 |
| 4,827,666 | 5/1989 | Tweddell, III | 47/58 |
| 5,406,746 | 4/1995 | Hoshino | 47/26 |
| 5,535,543 | 7/1996 | Alexander | 47/26 |

FOREIGN PATENT DOCUMENTS

| | | | |
|---|---|---|---|
| 123838 | 4/1900 | Germany . | |
| 207922 | 12/1907 | Germany . | |
| 46358 | 1/1909 | Hungary . | |
| 82024 | 5/1984 | Japan | 47/261 F |
| 6178623 | 6/1994 | Japan . | |
| 4532 | of 1879 | United Kingdom | 47/261 F |
| 385 | of 1891 | United Kingdom . | |
| 7585 | of 1897 | United Kingdom . | |
| 2215173 | 2/1989 | United Kingdom . | |
| 2223656 | 4/1990 | United Kingdom . | |

*Primary Examiner*—Michael J. Carone
*Assistant Examiner*—Son T. Nguyen
*Attorney, Agent, or Firm*—Fulbright & Jaworski L.L.P.

[57] ABSTRACT

A molded plastic fruit or vegetable guard defines a plurality of openings therein to permit air circulation. The guard is composed of a pair of halves having peripheral fastening edges which when snapped together from a guard surrounding the fruit or vegetable. A supporting member is disposed internally of the guard and contacts the fruit or vegetable to position the guard away from the surface of the fruit or vegetable to protect it from the animal, bird or other pests.

6 Claims, 3 Drawing Sheets

FRUIT OR VEGETABLE GUARD

BACKGROUND OF THE INVENTION

1. Field of the Invention

The present invention relates to a protective guard for growing fruit or vegetables. More particularly the guard relates to a protective device which may be fitted around fruit or vegetable during its growth and ripening stage to protect it from birds or animals while at the same time providing sufficient airflow and sunlight to permit the fruit or vegetable to mature and ripen.

2. Description of the Related Art

Although the present invention has a particular utility for the home gardener who grows a limited crop of fruit and/or vegetables and wishes to be able to harvest substantially all of the crop, it also has application to commercial farmers who wish to increase the percentage of harvest of matured fruit or vegetable. It is known that as fruits and vegetables of various types mature and began to ripen various types of animals as well as birds will attack the fruit since it appears to be particularly appetizing to them. In many instances commercial growers anticipate loss of 10% to 25% of their crop and merely tolerate the same with the theory that there is a sufficient volume to allow this and that this is merely part of the cost of doing business.

However where the home gardener is concerned, there is a limited space in which crops such as tomatoes may be grown or alternatively there may be a limited number of fruit trees such as apples, pears, peaches, plums and the like. Under these circumstances, the home gardener wishes to be able to harvest the maximum yield possible from the crop so as to make the most efficient utilization of the space available and to have a sufficient amount of the fresh crop to eat during the ripening process or alternatively to can or preserve for future utilization post ripening season.

In the prior art, various devices have been utilized for the purpose intended by the present invention. For example, U.S. Pat. No. 5,406,746 to Hoshino discloses a protective bag which is placed over the fruit and substantially eliminates the penetration of sunlight in the early stages of growth but gradually has its opacity reduced so that sufficient light may pass through to allow ripening of the fruit and the changing of its pigmentation. As is disclosed in Hoshino such previously has been accomplished by having a protective bag made in layers with each of the layers being removed manually during the process of growth. Such a process is obviously quite expensive.

Other protective devices have been made from a mesh product such as wire or the like and is formed in halves which can be secured together by a latching mechanism or by friction. Examples of such devices are shown in British Provisional Specification No. 7585 of Smith and German patent 123,838 to Dehler the manufacturer of such mesh type devices again is relatively expensive and renders the product difficult to use.

Devices molded from celluloid or glass and secured together have also been utilized. Examples of such devices are shown in British provisional specification 385 in which molded glass hemispheres are held together by a steel galvanized wire which is clamped together and fitted over the branch of the plant holding the vegetable or fruit. A device made of molded celluloid and held together by a bailnet type fastener is shown in Osztaly patent 463,582 to Halmbrechtsben. Again such devices are difficult to secure around the fruit or vegetable.

A similar type of molded plastic device is shown in Japanese Patent 6-178623 and United Kingdom Patents 2215173 A and 223656 A. In each of these patents a molded plastic device having transparency and/or openings provided therein is fitted around the fruit. In the Japanese patent disclosure lugs protruding from the periphery of the structure are used to attach the structure to the limbs of the plant or tree while in the two British patents the device is merely fitted around the stem to which the fruit or vegetable is attached and rests against the fruit or vegetable.

From the prior art it is seen that the protective structures either rest upon the fruit or vegetable or alternatively some type of lug or extension is used to attach the protective guard to the limb or stem of the tree or plant to keep it suspended away from the surface of the fruit or vegetable.

When the protective device has openings provided therein to allow appropriate circulation of air therethrough rests against the fruit or vegetable, birds and some other pests can attack the fruit or vegetable through the openings. It is therefore imperative that the surface of the fruit or vegetable be spaced from the inner surface of the guard by an amount sufficient to prevent the animals, bird or other pest from being able to attack the fruit or vegetable.

SUMMARY OF THE INVENTION

The present invention includes pair of members which when brought together provide a hollow interior for receiving the fruit or vegetable and includes an aperture through which the stem may pass. Displaced below the aperture by an amount sufficient to support the guard in a position away from the outer surface of the fruit or vegetable is support means affixed to the guard. The support means also defines an appropriate opening to receive the stem. The support means also defines a concave plane upon which the fruit or vegetable rests to appropriately center the protective guard thereby positioning the outer surface of the fruit or vegetable positioned at an appropriate distance from the inner surface of the protective guard out of reach of the animals, birds or other pests. The protective guard defines appropriate openings to permit the circulation of air therethrough.

Other objects and advantages of the present invention will become more apparent to those persons having ordinary skill in the art to which the present invention pertains from the foregoing description taken in conjunction with the accompanying drawings.

DETAILED DESCRIPTION OF THE PREFERRED EMBODIMENTS

Figure 1:
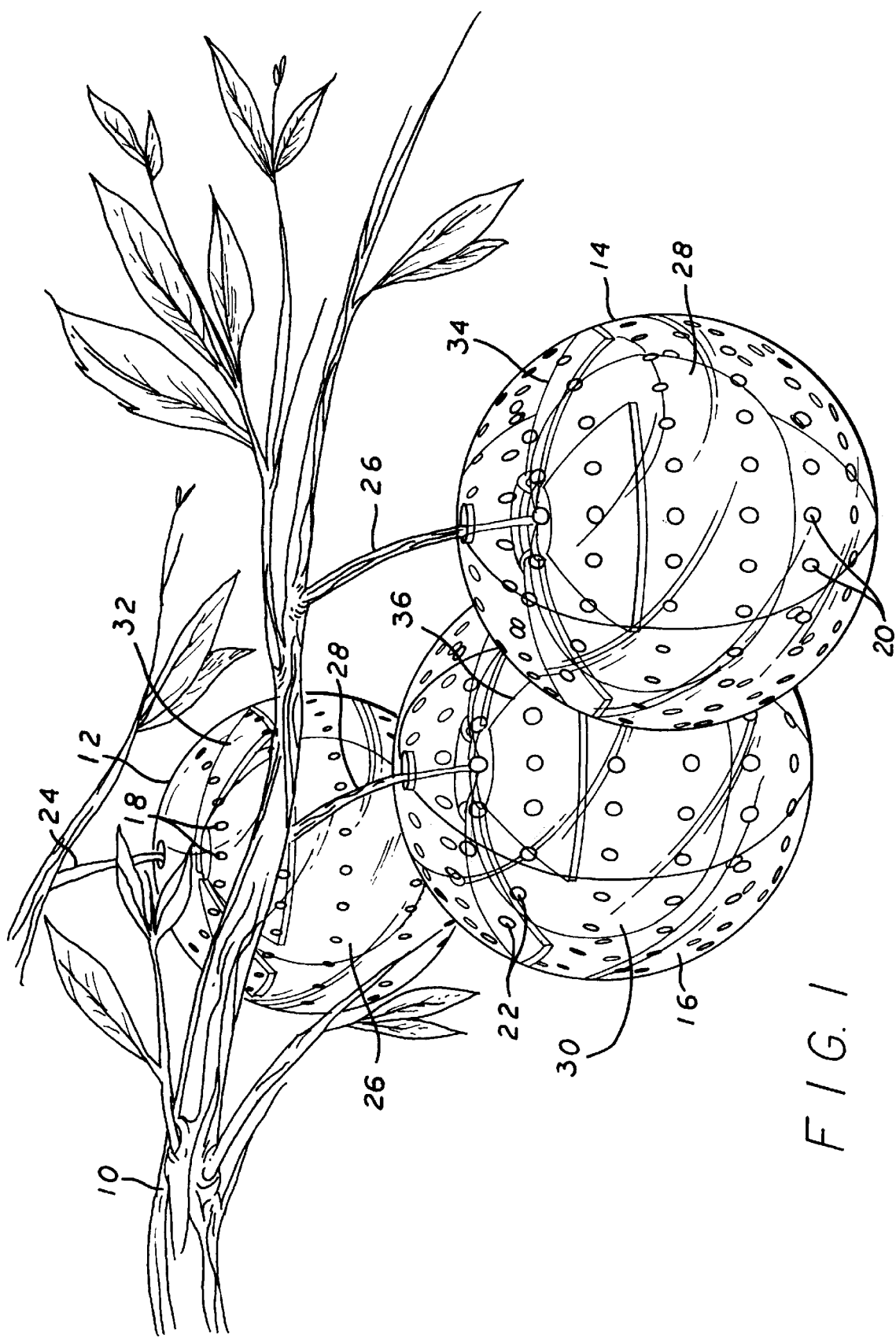
FIG. 1 illustrates the protective guard of the present invention in position over a fruit or vegetable in its growing position.

Referring now to the drawing and more particularly to FIG. 1, there is shown a limb or vine 10 of a growing plant or tree upon which there is suspended fruit or vegetable. For purposes of the detailed description of the present invention, it will be assumed that the item 10 is a tomato vine and that the item for protection is ripening tomatoes which are suspended from the tomato vine 10. The ripening tomatoes are shown on the vine encased by guards 12, 14 and 16 constructed in accordance with the principles of the present invention. The guards 12, 14 and 16 may be of various sizes and shapes depending upon the fruit or vegetable to be protected including as in this instance where it is tomatoes. The size of the tomato will also control the size of the guard being placed there around. As is illustrated, each of the guards 12, 14 and 16 defines a plurality of openings 18, 20 and 22 therein. The openings are provided over the entire shell or body of the protective guard and are provided to permit the flow of air through the guard and into contact with the tomato to permit it to grow and ripen. An appropriate opening is also provided to allow the stem 24, 26 and 28 to pass through the guard 12, 14 and 16, respectively. The tomato 30 is shown disposed internally of the guards 12, 14 and 16, respectively. A supporting member 32, 34 and 36 is disposed internally of the guards 12, 14 and 16, respectively, and engages the upper surface of the tomato 30, respectively to suspend the guard away from the outer surface of the tomato to thereby eliminate the possibility of animals, birds or other pests attacking the tomato through the openings. It should be obvious to those skilled in the art that the openings may be any size desired so long as they are small enough to keep a bird beak from being able to enter and it has been found that openings of approximately 7 millimeters in diameter meet this criteria.

The guards 12, 14 and 16 may be formed of any material desired. However, preferably they are formed of injection molded transparent plastic material which is light in weight. The transparency will permit the sun to contact the tomato to allow it to ripen in the normal course of events. Preferably the molded plastic is formed in two halves which may be snapped together and secured about the tomato.

Figure 2:
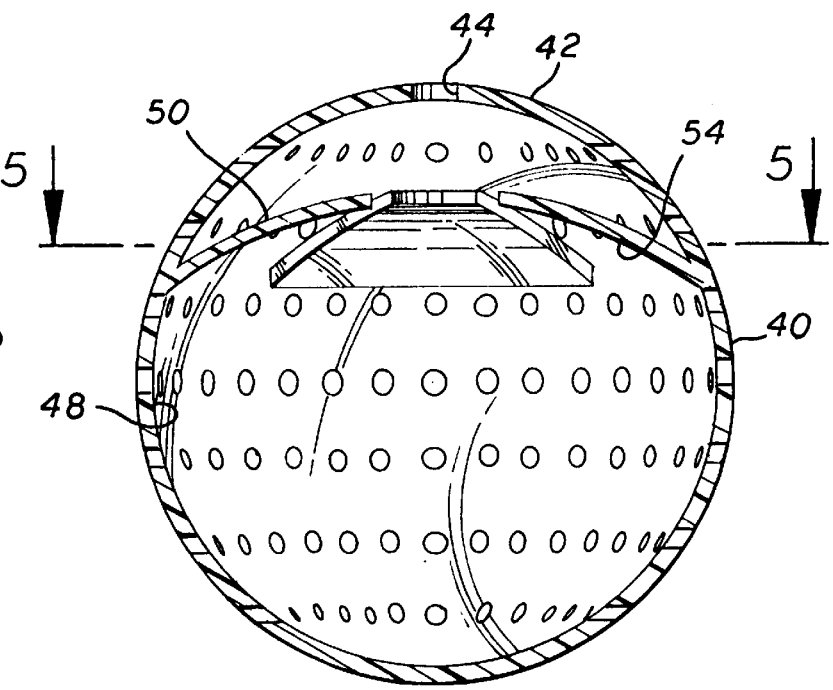
FIG. 2 illustrates one-half of a protective guard constructed in accordance with the present invention.

Referring now more specifically to FIG. 2, there is illustrated in elevation one-half of a guard such as those shown as 12, 14 and 16 in FIG. 1. The member as shown in FIG. 2 includes a hollow shell 40 which at its upper portion 42 defines one-half of an opening 44. When the two halves such as shown in FIG. 2 are snapped together, the half openings 44 will mate to provide an opening through which the tomato stem passes. As is illustrated, the member 40 defines a plurality of openings disposed and preferably evenly spaced throughout the entire body of the member 40 to allow the circulation of air through the interior surface and about the tomato to allow it to mature and ripen. Extending from the inner surface 48 of the member 40 is a support means 50 which also defines an opening therethrough to permit the stem of the tomato to pass therethrough. The support means 50 may be formed of any member in any manner desired and may be an integral part of the member 40 or may be a member which has been attached to the inner surface 48 of the member 40 subsequent to formation of the member 40. As is illustrated in FIG. 2, the lower surface 54 (as viewed in FIG. 2) of the support means 50 when extended defines a concave plane or surface. The surface 54 receives the upper surface of the tomato and causes the guard to position itself so that the inner surface 48 is substantially equal distance from the outer surface of the tomato and provides approximately one-half inch of space to permit the appropriate circulation of air and to also prevent the beak of a bird from being able to enter one of the openings and contact the tomato.

Figure 3:
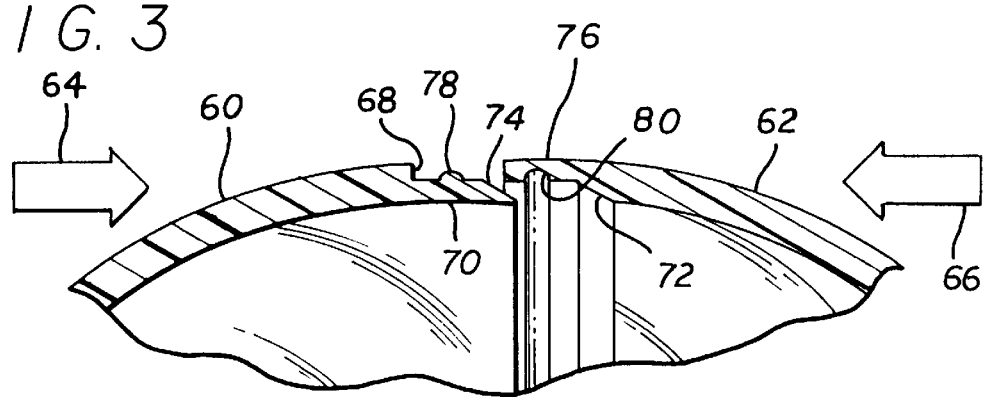
FIG. 3 is a partial cross-sectional view illustrating one means of fastening the two halves of the protective guard together.

The two halves each being similar to that shown at 40 may be brought together and snapped in position to provide the hollow protective cover within which the tomato is disposed for appropriate protection. Various types of structure may be utilized to secure the two halves together. One such structure is shown in FIG. 3 and illustrates the periphery of halves 60 and 62 which are brought together in the direction as shown by the arrows 64 and 66. The half 60 is reduced in thickness about its periphery and defines a shoulder 68 and a tongue 70. The half 62 is also reduced in thickness and provides a canted surface 72. The tongue 70 also provides a canted surface 74. When the two halves are brought together as shown by the arrow 64 and 66 the protrusion 76 slides over the tongue 74 and the protrusion 76 will abut the shoulder 68 while the two canted surfaces 72 and 74 come together. When such occurs a raised bead 78 on the upper surface of the tongue 70 will engage a detent formed as a continuous groove 80 in a protrusion 76 thereby providing sufficient friction to lock the two halves 60 and 62 together to form the desired protective guide with the hollow interior to protect the tomato.

Figure 4:
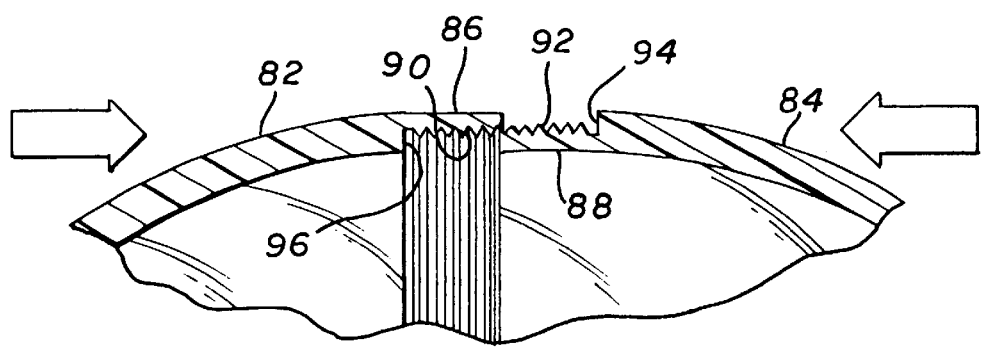
FIG. 4 is a view similar to FIG. 3 but illustrating an alternative securing means.

By reference to FIG. 4 there is shown an alternative securing mechanism for the two halves 82 and 84. As is illustrated in FIG. 4, each of the two halves have reduced thickness protrusions 86 and 88, respectively. On the lower surface of the protrusion 86 there are formed a plurality of teeth 90 while a similar plurality of teeth 92 are formed on the upper surface of the protrusion 88. When the two halves are brought together, the protrusions 86 and 88 provide sufficient resiliency to permit the teeth 90 and 92 to ride over each other until the protrusions 86 and 88 abut the shoulders 94 and 96 formed on the halves 84 and 82, respectively.

It will be understood by those skilled in the art that other types of securing mechanisms may be utilized to cause the two halves of the protective guard to be brought together and secured in place. it should also be recognized that in each instance the securing structure whether it be the bead and groove 78-80 of FIG. 3 or the teeth 90, 92 of FIG. 4 or similar structures that the angles of the securing members be sufficiently shallow to permit the two halves of the guard to be separated when the tomato is to be removed from the inner portion of the guard. Preferably the removability is such that the two halves of the guard may be saved and reused at a later time.

Figure 5:
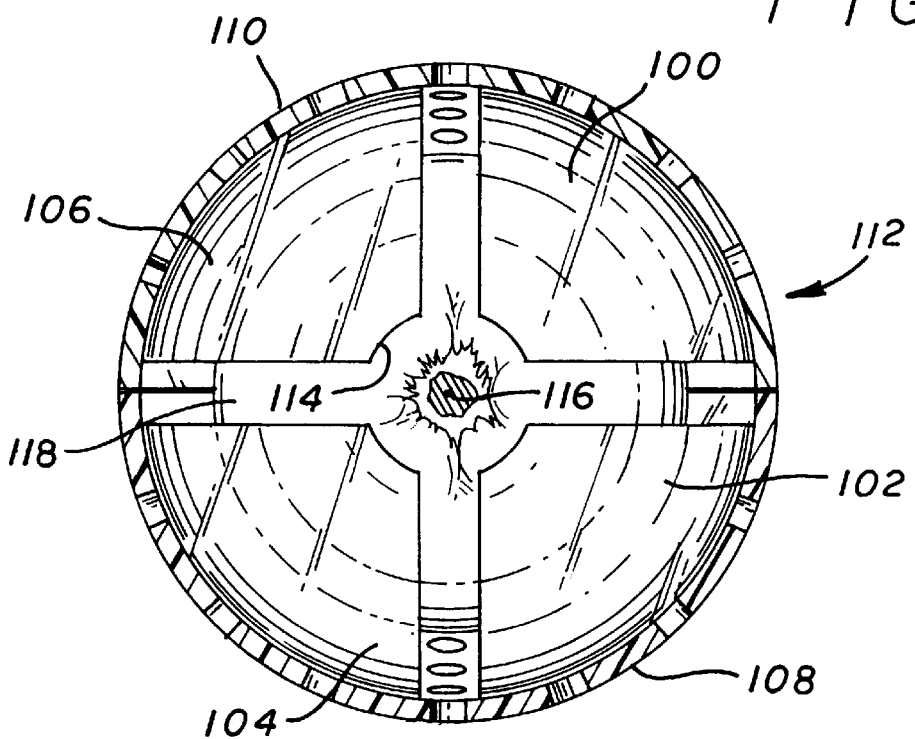
FIG. 5 is a partial cross-sectional view taken about the lines 5—5 of FIG. 2.

By reference now more specifically to FIG. 5, the supporting means 50 of FIG. 2 is shown in greater detail. FIG. 5 is a plan view partly in cross-section taken about the lines 5—5 of FIG. 2. A preferred form of the supporting means 50 includes a plurality of curved fingers 100, 102, 104 and 106. Preferably each of the fingers is molded as an integral part of each of the respective halves 108 and 110 of the guard 112. As is shown, the inner most ends of each of the fingers define an opening 114 sufficiently large enough to adequately receive the stem 116 of the tomato 118 disposed therein. Although in FIG. 5 the supporting means 50 is illustrated as four inwardly directed fingers, it should be understood that any number of fingers, two or greater may be utilized as desired. An important and critical characteristic is that the lower surface (not shown) of the fingers defines the concave plane as discussed above with regard to the support means 50 in FIG. 2. As above indicated, it is this concave plane which enables the guard to be appropriately spaced from the surface of the tomato 118 to protect it from attack by birds and other pests.

Figure 6:
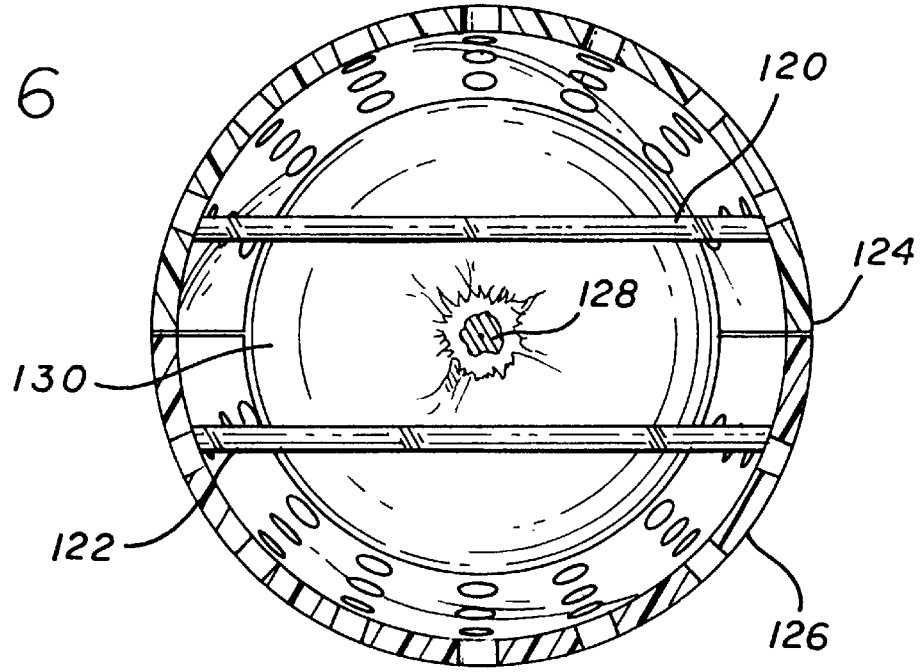
FIG. 6 is a view similar to FIG. 5 but showing an alternative support means.

By reference now more specifically to FIG. 6 there is shown a view similar to that of FIG. 5 but shows the support means as a pair rods 120 and 122 extending across each of the two halves 124 and 126 of the guide. The space between the two rods 120 and 122 provide an area where the stem 128 of the tomato 130 may easily be disposed. Again, it should be recognized that the two rods 120 and 122 are curved when viewed as shown in FIG. 2 to provide the concave plane by the surfaces as shown at 54 in FIG. 2. It of course being understood that if the rods 120 or 122 were displayed in a view similar to that of FIG. 2, they would be continuous and not broken as is illustrated by the support member or means 50 of FIG. 2.

Those skilled in the art will recognize that modifications may be made to the structure as illustrated herein without departing from the spirit of the invention as defined by the claims which follow:

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A growing fruit or vegetable protective guard comprising;

two members defining at their peripheries securing means such that when secured together a hollow interior is defined for receiving the fruit or vegetable; each said member defining a plurality of openings to permit air to circulate through the guard and about the fruit or vegetable disposed therein;

said members when secured together defining an aperture for receiving the stem attached to the fruit or vegetable; and support means extending from an inner surface of said guard and engaging said fruit or vegetable to dispose the inner surface thereof displaced from the surface of the fruit or vegetable by an amount sufficient to preclude attack by animals, birds or other pests.

2. A protective guard as defined in claim 1, wherein such support means includes a curved surface which when extended would constitute a concave plane in contact with such fruit or vegetable.

3. A protective guard as defined in claim 2, wherein said support means includes a plurality of curved fingers extending from the inner surface of said guard.

4. A protective guard as defined in claim 2, wherein said support means comprises a pair of spaced apart rods extending from the inner surface of each said member.

5. A protective guard as defined in claim 3, wherein said guard and said plurality of fingers are formed as a unitary molded plastic member.

6. A protective guard as defined in claim 5, wherein said rods and said guard are formed as a unitary molded plastic member.

\* \* \* \* \*